Dec. 13, 1938.    R. W. SIMPSON    2,139,776
COMBUSTION DEVICE
Filed Nov. 12, 1936

INVENTOR.
RALPH W. SIMPSON
BY
L.A. Paley
ATTORNEY.

Patented Dec. 13, 1938

2,139,776

UNITED STATES PATENT OFFICE 2,139,776

COMBUSTION DEVICE

Ralph W. Simpson, Warren, Ohio

Application November 12, 1936, Serial No. 110,450

2 Claims. (Cl. 263—15)

This invention relates to combustion devices, and has reference more particularly to devices of the class described especially adapted for use in open hearth furnaces.

An open hearth furnace consists of a melting hearth over which combustion takes place to melt the charge of steel. Without preheating of the air and fuel, a temperature high enough to melt steel cannot be attained. In order to accomplish this preheating of the gas and air, opposite and identical ports and orifices are formed as part of the furnace and are provided with checker brick chambers, one for gas and one for air at each side of the furnace.

Preheating is accomplished by heating a mass of checker brick with the waste products of combustion for a period of time, then closing these heated checkers to the outgoing products of combustion, and passing the incoming air through this checker,—likewise passing the incoming gas through another similar heated checker. The direction of the gases is reversed about every twenty minutes so as to keep the checkers considerably hotter then the incoming gas and air. As exhaust ports become alternately inlet ports and being of fixed size, difficulties in operation develop.

Fuel consumption varies with the different stages of heat, that is, melting down generally consumes more fuel, and refining less fuel. The operator rarely changes his supply of air and I find that if the air is metered and adjusted to the volume of fuel, the highest temperatures are of necessity reached, and a considerable saving in fuel consumption is effected. I find, however, that when the flow of fuel gas is reduced with air reduced in proportion, velocities became so low that the incoming fuel gas would burn along the roof and quickly melt it down, thus decreasing furnace life. I have discovered that some means of changing the inlet port size with a change in fuel consumption is imperative.

An object of this invention, therefore, is to provide a port construction for open hearth furnaces or other combustion devices, in which the area of the fuel and air orifices may be varied to insure sufficient gas velocity to prevent the flame from burning along the roof of the furnace and destroying the brickwork.

Another object of the invention is to provide a combustion device for open hearth furnaces which effects important savings in fuel consumption by adjustment of the amount of fuel to the heat requirements of the batch of steel; also to improve combustion devices in other respects hereinafter specified and claimed.

Figure 1:
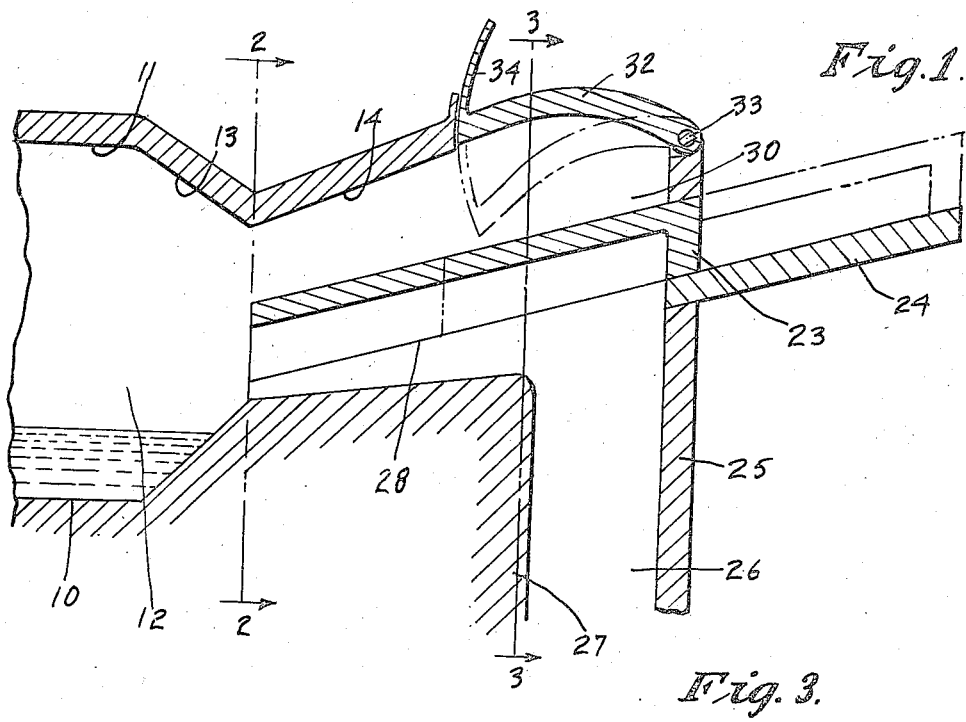
Figures 2, 3:
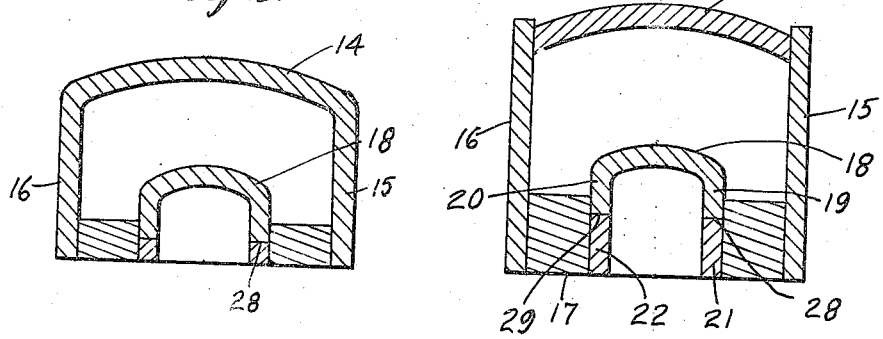

Reference is to be had to the accompanying drawing forming a part of this specification, in which Fig. 1 is a central sectional elevation through the air and fuel ports at one side of the improved open hearth furnace, and Figs. 2 and 3 are sectional elevations through the furnace taken on lines 2—2 and 3—3 respectively.

Referring to the drawing by numerals, a standard open hearth furnace consists in a melting hearth 10 which is generally rectangular or oval in shape, and is provided with a roof 11. In practice it is customary to provide air and fuel ports at diametrically opposite points, these ports being connected to checker chambers for the purpose of preheating the air and gas prior to entry into combustion space 12 so as to insure a high enough temperature to melt the steel. The flow of gas and air is reversed in direction periodically so as to keep the checker chambers hot.

The salient feature of this invention consists in the construction of these gas and air ports so that the cross sectional areas of the gas and air ports may be varied at will between certain limits. This variation in port area permits the velocity of the gas and air to be maintained constant, or varied to suit the requirements of a steel "heat" at various stages of refinement. To accomplish this result, the roof 11 has a downwardly sloping area 13 adjacent the periphery of the hearth, and an air port roof 14 slopes upwardly from the section 13. The roof 14 is preferably arcuate in cross section as seen in Figs. 2 and 3, said roof terminating in downwardly extending walls 15 and 16 so as to form an inverted U-shaped chamber of variable cross-section area for the passage of air. The bottoms of walls 15 and 16 are supported on the ground or port base 17. A fuel gas port roof member 18 is generally arcuate in cross section, and is provided with downwardly extending walls 19 and 20 which are slidably supported on their lower edges on fixed walls 21 and 22 respectively. It will be seen that the fuel gas port member 18 is in the form of an inverted U, and the rear of said port is provided with a closure wall 23 which slidably engages a fixed wing 24, the latter extending rearwardly at an inclination from a rear wall 25 on the furnace structure. A fuel gas inlet duct 26 extends upwardly between wall 25 and a solid masonry foundation 27, so as to conduct the fuel gas from checkerwork, not shown, to the fuel gas port 18. The bottom edges of port walls 19 and 20 are slidably supported on inclined ledges 28 and 29 formed on the tops of walls 21 and 22 respectively. The gas port 18 may be moved manually or automatically by mechanism not shown, but well known to the art, to the extreme dot and dash position as shown in Fig. 1 or to any intermediate position. This movement of the gas port member 18 up the inclined ledges 28 and 29, increases the area of the gas orifice by increasing the distance between gas port roof 18 and the base 17.

The roof 14 has a still greater inclination to the horizontal than the gas port roof 18, so that when the gas port is moved to the right and upwardly as seen in Fig. 1, the area of the air port also increases the volume of air for burning the larger volume of fuel gas. Thus the velocity of air and gas delivered to the hearth 10 may be varied within reasonable limits to vary the intensity of heat at different stages in the operation, and to maintain a sufficiently high gas and air velocity that the flame does not burn along the hearth roof 11 and destroy the brickwork. When the direction of the gases is reversed to heat up the checker chambers, gas port 18 may be withdrawn to the extreme right hand position, so that the least possible resistance is offered to the flow of hot gases of combustion through the gas duct 26 and an air duct 30. The gas port 18 is preferably provided with hollow walls for water cooling in a manner well known to the art.

In order to provide for greater flexibility and independent variation of both the gas and air velocities, a damper 32 is arranged in the roof 14, said damper extending the full width between the walls 15 and 16 and being hinged thereto by means of pivot rod 33. An arcuate wing 34 is formed on the edge of damper 32 opposite the hinge rod 33 so as to maintain a substantially gas tight seal as the damper swings to vary the velocity or volume of the air relative to the velocity of the gas. Any suitable crank means not shown may be used to rock the damper 32.

With the port construction disclosed, vastly different quantities of fuel may be burned with constant velocity, or a constant volume of fuel may be burned with greatly differing velocities. My improved combustion device effects a fuel saving of about 25% in the operation of open hearth furnaces. The improved design permits the burning of the maximum amount of fuel when the furnace is cool with little erosion of the brickwork, and permits the burning of a minimum of fuel when the furnace is hot, again reducing the erosion of the brickwork. Maintenance costs with the improved design are thus very low. Since the maximum amount of fuel will be burnt in the melt-down stage of operation, the heating time for a heat of steel will be reduced 10 to 20%. In the past, it has been necessary to supply different size burners for different size furnaces or combustion capacities.

With my improved design, such duplication of equipment is largely avoided. With a standard, or fixed size port orifice, it is necessary to run the furnace with little change in fuel rate, because a change to increase will cause the flame to stretch across the furnace to the outlet port and burn down in the checkers thereby shortening checker life, and because a change to decrease will cause the flame to float along the roof thereby shortening roof life. These difficulties are avoided with my improved variable ports.

It should be understood that my invention can be widely used for furnaces of different kinds, and for combustion devices in general. The example illustrated represents but one embodiment of the invention which can be varied considerably without departing from the spirit of the invention as defined in the appended claims.

Having thus described my invention, I claim as new and desire to secure by Letters Patent:—

1. In a combustion structure for open hearth furnaces, an inverted U-shaped fuel inlet port member having a pair of downwardly extending walls, a pair of vertical walls having inclined ledges slidably supporting said port member walls so that said port member may be moved along said ledges into a plurality of adjusted positions, a bottom wall between said vertical walls, the cross sectional area of the port formed by said port member and vertical walls varying as said port member changes position along said inclined ledges, said bottom wall and the upper portion of said port member being inclined with respect to each other towards said port, and an air inlet port structure communicating with said port and partly defined by said port member and having an upper wall in diverging relation to said bottom wall, and adapted to vary in effective cross sectional area as the cross sectional area of said fuel port varies.

2. In a combustion structure for open hearth furnaces, and inverted U-shaped fuel inlet port member having a pair of downwardly extending walls, a pair of vertical walls having inclined ledges slidably supporting said port member walls so that said port member may be moved along said ledges into a plurality of adjusted positions, a bottom wall between said vertical walls, the cross sectional area of the port formed by said port member and vertical walls varying as said port member changes position along said inclined ledges, said bottom wall and the upper portion of said port member being inclined with respect to each other towards said port, an air inlet port structure communicating with said port and partly defined by said port member and having an upper wall in diverging relation to said bottom wall, and adapted to vary in effective cross sectional area as the cross sectional area of said fuel port varies, and damper means associated with one of said ports for independently varying the orifice area of said port.

RALPH W. SIMPSON.